United States Patent
Singh et al.

(10) Patent No.: US 10,061,298 B2
(45) Date of Patent: Aug. 28, 2018

(54) CONTROL OF MACHINERY WITH CALIBRATED PERFORMANCE MODEL

(71) Applicant: General Electric Company, Schenectady, NY (US)

(72) Inventors: Anurag Singh, Altamont, NY (US); Steven Di Palma, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 295 days.

(21) Appl. No.: 15/139,481

(22) Filed: Apr. 27, 2016

(65) Prior Publication Data

US 2017/0315537 A1    Nov. 2, 2017

(51) Int. Cl.
   G05B 19/40     (2006.01)
   G05B 19/4097   (2006.01)

(52) U.S. Cl.
   CPC ............ *G05B 19/4097* (2013.01); *G05B 2219/42155* (2013.01); *G05B 2219/50068* (2013.01)

(58) Field of Classification Search
   None
   See application file for complete search history.

(56) References Cited

U.S. PATENT DOCUMENTS

| | | | |
|---|---|---|---|
| 4,242,989 A | 1/1981 | Chamberlain | |
| 4,437,313 A | 3/1984 | Taber et al. | |
| 6,412,285 B1 | 7/2002 | Ranasinghe et al. | |
| 7,021,126 B1 | 4/2006 | Badami et al. | |
| 7,053,341 B2 | 5/2006 | Arora et al. | |
| 7,931,041 B2 | 4/2011 | Mehendale et al. | |
| 8,463,445 B2 | 6/2013 | Kumar et al. | |
| 8,757,105 B2 | 6/2014 | Kumar et al. | |

(Continued)

FOREIGN PATENT DOCUMENTS

| | | |
|---|---|---|
| EP | 1387046 B1 | 10/2007 |
| EP | 2339177 A1 | 6/2011 |
| EP | 2599971 A2 | 5/2013 |

OTHER PUBLICATIONS

Extended European Search Report and Opinion issued in connection with corresponding EP Application No. 17167847.7 dated Sep. 22, 2017.

*Primary Examiner* — Jason Lin
(74) *Attorney, Agent, or Firm* — Ernest G. Cusick; Hoffman Warnick LLC (57) ABSTRACT

Embodiments of the present disclosure include methods, systems, and program products for controlling a machine. Methods according to the present disclosure can include: calculating, using a performance model of the machine, a set of inter-stage conditions of the machine corresponding to one of a set of input conditions and a set of output conditions during an operation of the machine, wherein the machine includes a turbine component having a fluid path therein traversing a plurality of turbine stages and a plurality of inter-stage positions; calibrating the performance model of the machine based on a difference between a predicted value in the performance model of the machine and one of the set of input conditions and the set of output conditions; and adjusting an operating parameter of the machine based on the calibrated performance model and the calculated set of inter-stage conditions of the machine.

20 Claims, 5 Drawing Sheets

(56) References Cited

U.S. PATENT DOCUMENTS

| | | | |
|---|---|---|---|
| 8,813,471 | B2 | 8/2014 | Gulen et al. |
| 8,887,747 | B2 | 11/2014 | Kumar et al. |
| 9,771,877 | B2 * | 9/2017 | Davis, Jr. .................. F02C 9/56 |
| 2003/0083827 | A1 | 5/2003 | Chow et al. |
| 2007/0168057 | A1 * | 7/2007 | Blevins ................ G05B 13/022 |
| | | | 700/53 |
| 2008/0021675 | A1 | 1/2008 | Fehr et al. |
| 2010/0077970 | A1 * | 4/2010 | Kumar ...................... F01K 7/06 |
| | | | 122/479.1 |
| 2010/0281843 | A1 * | 11/2010 | Smith ...................... F01D 17/08 |
| | | | 60/39.091 |
| 2012/0032979 | A1 | 2/2012 | Blow et al. |
| 2012/0072194 | A1 * | 3/2012 | Arnold .................... F02C 7/057 |
| | | | 703/7 |
| 2012/0210257 | A1 | 8/2012 | Mosley et al. |
| 2013/0046519 | A1 | 2/2013 | Esakki et al. |
| 2014/0005909 | A1 | 1/2014 | Meisner et al. |
| 2014/0121935 | A1 * | 5/2014 | Zhang ........................ F02C 9/00 |
| | | | 701/100 |
| 2014/0260312 | A1 | 9/2014 | Davis, Jr. et al. |
| 2015/0152791 | A1 | 6/2015 | White |
| 2015/0090202 | A1 | 8/2015 | Nenmeni et al. |

* cited by examiner

CONTROL OF MACHINERY WITH CALIBRATED PERFORMANCE MODEL

BACKGROUND

The disclosure relates generally to control systems and methods for machinery, and more specifically, includes generating a performance model based on various conditions and outputs of the machine to actively control the operation of the machine.

Combustion-based power sources such as gas turbine assemblies can generate mechanical energy by combusting a source of fuel intermixed with compressed air. These combustion reactions create mechanical power for driving a load component attached to the combustion-based power source (e.g., by a rotatable shaft). The effectiveness of combustion-based power sources and similar power generation devices can depend on their implementation, environment, and/or other factors such as manufacturing quality and state of operation (e.g., transient state or steady state). A large number of user-driven and environmental factors can affect the performance of a machine, including the degree of energy output, efficiency of the machine and its components, and estimates of part and/or system lifespan.

Conventional control systems may use pre-modeled and estimated qualities to calculate a limited number of the machine's physical properties over pre-determined time intervals and at several locations. Although modeling techniques have improved with time and with advancements in computer systems, even minor differences between a model of the machine and its actual performance can translate to substantial economic shortfalls in cost savings, amount of energy generated, unmet or exceeded demand, manufacture and installation costs, etc. The potential for economic benefit may be more pronounced where energy demand varies with season, time, location, etc.

SUMMARY

A first aspect of the disclosure provides a method for controlling a machine, the method including: calculating, using a performance model of the machine, a set of inter-stage conditions of the machine corresponding to one of a set of input conditions and a set of output conditions during an operation of the machine, wherein the machine includes a turbine component having a fluid path therein traversing a plurality of turbine stages and a plurality of inter-stage positions, and wherein each of the set of input conditions, the set of output conditions, and the set of inter-stage conditions includes one of a temperature, a pressure, and a flow rate; calibrating the performance model of the machine based on a difference between a predicted value in the performance model of the machine and one of the set of input conditions and the set of output conditions; and adjusting an operating parameter of the machine based on the calibrated performance model and the calculated set of inter-stage conditions of the machine.

A second aspect of the disclosure provides a system for controlling a machine, the system including: a system controller in communication with a monitoring system of the machine, the system controller being operable to: calculate, using a performance model of the machine, a set of inter-stage conditions of the machine corresponding to a set of input conditions and a set of output conditions during an operation of the machine, wherein the machine includes a turbine component having a fluid path therein traversing a plurality of turbine stages and a plurality of inter-stage positions, wherein each of the set of input conditions, the set of output conditions, and the set of inter-stage conditions includes one of a temperature, a pressure, and a flow rate, and calibrate the performance model of the machine based on a difference between a predicted value in the performance model of the machine and one of the set of input conditions and the set of output conditions; and a control valve operably coupled to the system controller and an inlet of the turbine component, the control valve being operable to adjust an operating parameter of the machine based on the calibrated performance model and the calculated set of inter-stage conditions of the machine.

A third aspect of the invention provides a program product stored on a computer readable storage medium for controlling a machine, the computer readable storage medium including program code for causing a computer system to: calculate, using a performance model of the machine, a set of inter-stage conditions of the machine corresponding to a set of input conditions and a set of output conditions during an operation of the machine, wherein the machine includes a turbine component having a fluid path therein traversing a plurality of turbine stages and a plurality of inter-stage positions, wherein each of the set of input conditions, the set of output conditions, and the set of inter-stage conditions includes one of a temperature, a pressure, and a flow rate; calibrate the performance model of the machine based on a difference between a predicted value in the performance model of the machine and one of the set of input conditions and the set of output conditions; and adjust an operating parameter of the machine based on the calibrated performance model and the calculated set of inter-stage conditions of the machine

BRIEF DESCRIPTION OF THE DRAWINGS

These and other features of the disclosed system will be more readily understood from the following detailed description of the various aspects of the system taken in conjunction with the accompanying drawings that depict various embodiments, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Embodiments of the present disclosure provide for the active control of a machine, including turbomachinery such as gas turbines, wind turbines, water turbines, etc. Embodiments of the present disclosure can apply a generated performance model of a machine to calculate attributes of the machine, which can then be compared with their actual values to calibrate the performance model as the machine continues to operate. The term "performance model" can include any equation, system of equations, matrix, algorithm, and/or mathematical model which relates one or more sets of input conditions, output conditions, and energy outputs to various operating parameters and internal conditions of a machine, including internal conditions of a fluid path through one or more turbine stages and inter-stage positions of a turbine component. In an example embodiment, methods of controlling a machine can include calculating a set of inter-stage conditions of a machine, where the inter-stage conditions in the set correspond to a set of input and/or output conditions of the same machine. The inter-stage conditions generally refer to physical properties (e.g., temperature, pressure, flow rate) of the machine with a fluid path which traverses several turbine stages and inter-stage positions. More specifically, an inter-stage condition quantifies such properties between successive stages of a turbomachine.

The performance model may predict one or more quantities representing input and/or output conditions, and these predicted quantities may differ from actual measured values for the turbomachine. To reconcile these differences, embodiments of the present disclosure include calibrating the performance model of the machine based on a difference between the predicted values yielded from the performance model and the measured input and/or output conditions. Calibrating the performance model can include, e.g., modifying intermediate variables to change the relationship between the variables included in the performance model. To provide active control of a machine during its operation, embodiments of the present disclosure include adjusting one or more operating parameters of the machine based on the calibrated performance model and calculated set of inter-stage conditions.

Figure 1:
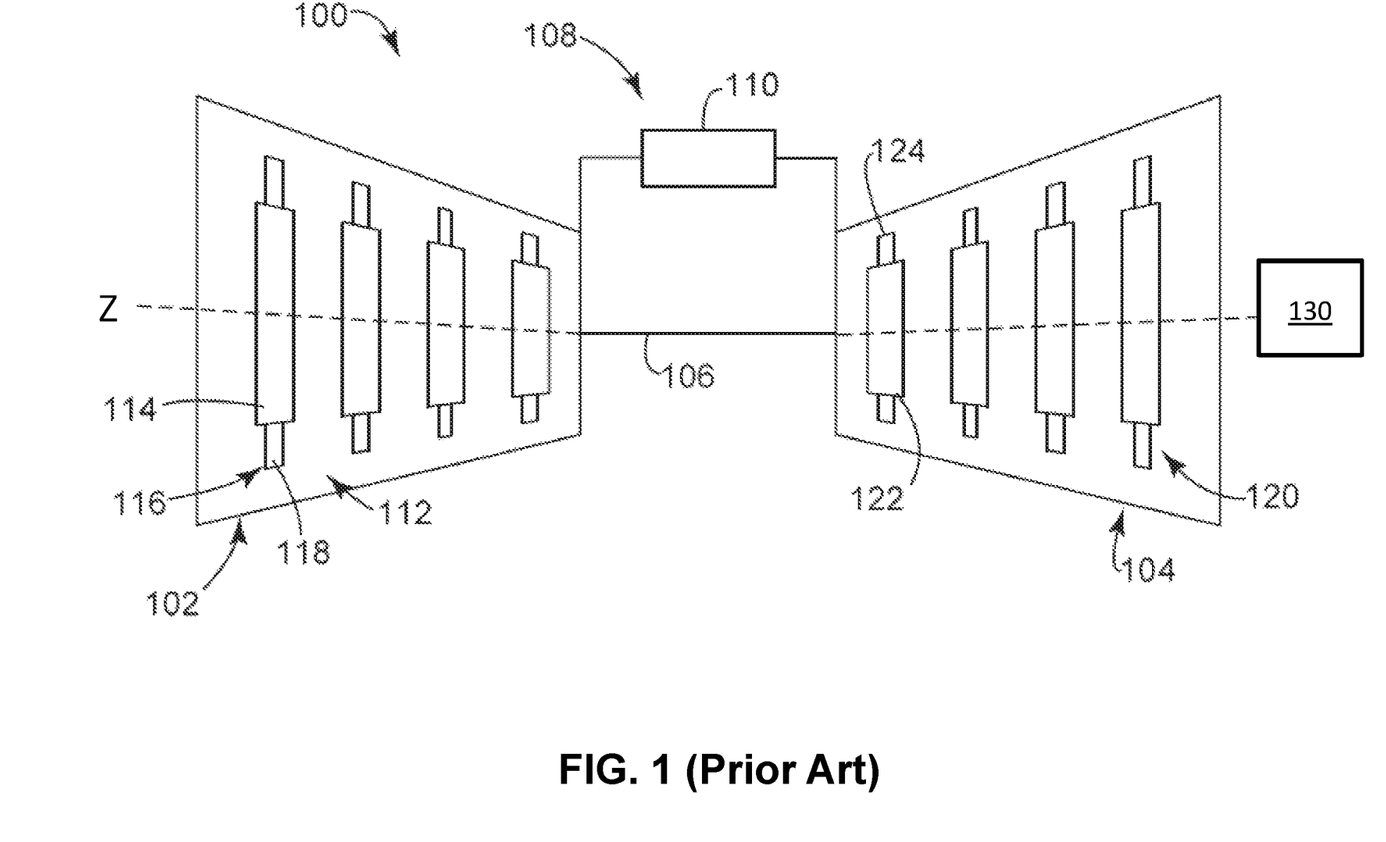
FIG. 1 is a schematic view of a conventional turbomachine system.

FIG. 1 shows a conventional turbomachine 100 that includes a compressor component 102 operatively coupled to a turbine component 104 through a shared compressor/turbine shaft 106. Turbomachine 100 is depicted as being in the form of a gas turbine in FIG. 1, but it is understood that other types of machines (e.g., steam turbines, water turbines, etc.) can be substituted for gas turbines in embodiments of the present disclosure. More generally, any machine which includes an embodiment of turbine component 104 can be used, modified, and/or controlled to yield embodiments of the present disclosure as discussed herein. Compressor component 102 can be fluidically connected to turbine component 104, e.g., through a combustor assembly 108. Combustor assembly 108 includes one or more combustors 110. Combustors 110 may be mounted to turbomachine 100 in a wide range of configurations including, but not limited to, being arranged in a can-annular array. Compressor component 102 includes a plurality of compressor rotor wheels 112. Compressor rotor wheels 112 include a first stage compressor rotor wheel 114 having a plurality of first stage compressor rotor blades 116 each having an associated airfoil portion 118. Similarly, turbine component 104 includes a plurality of turbine wheel components 120 including one or more rotor wheels 122 having a set of corresponding turbine rotor blades 124.

During operation, an operative fluid such as a combusted hot gas can flow from combustor(s) 110 into turbine component 104. The operative fluid in turbine component 104 can pass over multiple rotor blades 124 mounted on turbine wheel 122 and arranged in a group of successive stages. The first set of turbine blades 124 coupled to wheel 122 and shaft 106 can be identified as a "first stage" of turbomachine 100, with the next set of turbine blades 124 being identified as a "second stage" of turbomachine 100, etc., up to and the last set of turbine blades 124 in a final stage of turbomachine 100. The final stage of turbomachine 100 can include the largest size and/or highest radius turbine blades 124 in turbomachine 100. A plurality of respective nozzles (not shown) can be positioned between each stage of turbomachine 100 to define inter-stage portions of a flow path through turbomachine 100. The operative fluid flowing over each turbine blade 124 can rotate blades 124 by imparting thermal and mechanical energy thereto, thereby rotating shaft 106 of turbomachine 100. Rotating shaft 106 can thereby generate power by being mechanically coupled to a generator component 130 which converts mechanical energy of shaft 106 into electrical energy for powering devices connected to generator 130. The amount of electrical energy produced by generator 130 can be measured, e.g., in Joules (J) as an amount of work and/or power produced by turbomachine 100.

Figure 2:
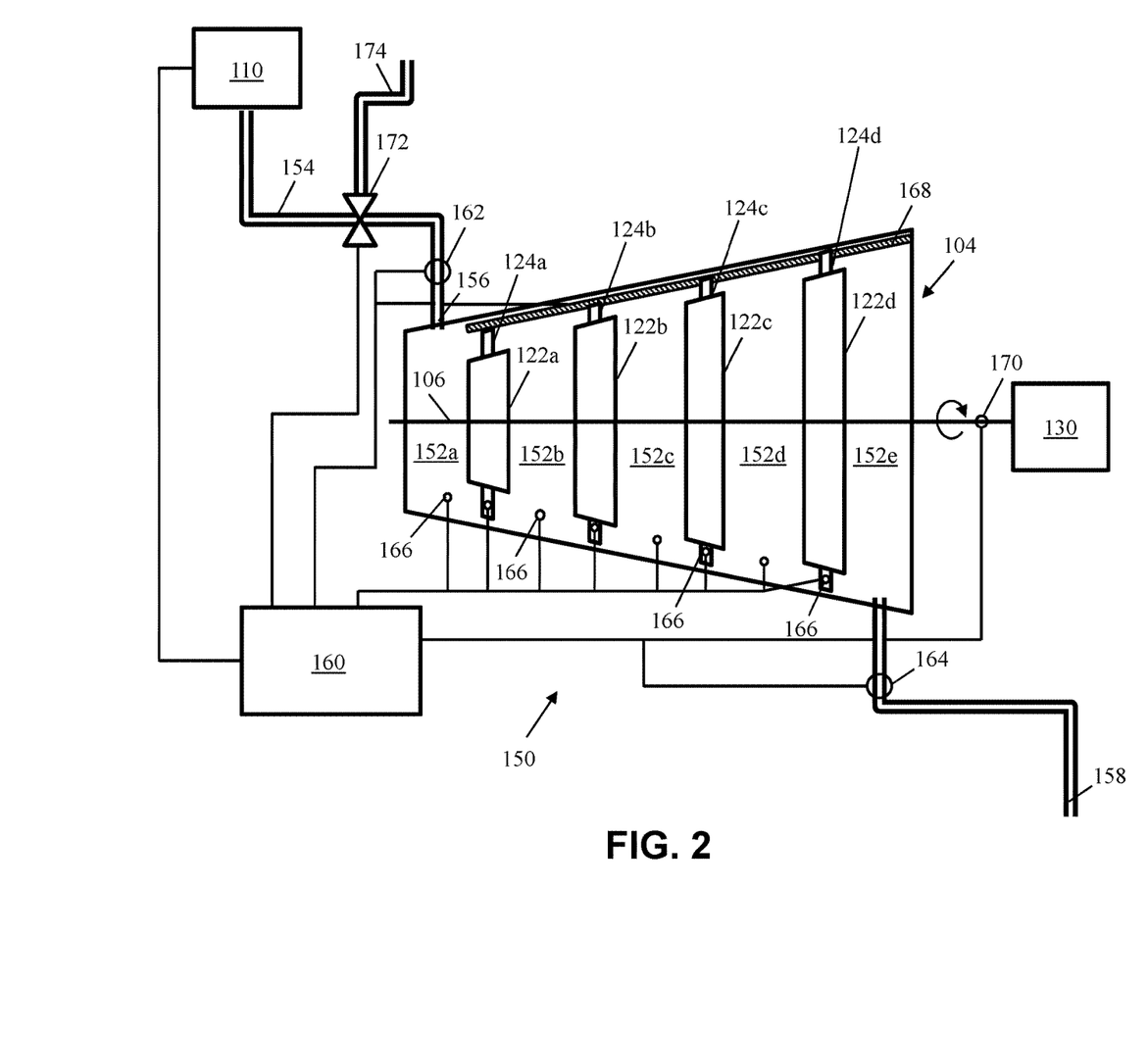
FIG. 2 is a schematic view of a turbine component with a system for controlling a machine according to embodiments of the present disclosure.

Turning to FIG. 2, a system 150 for controlling the operation of a machine according to embodiments of the present disclosure is shown. System 150 can include and/or interact with turbine component 104 to improve the performance of turbomachine 100 (FIG. 1) and/or other types of machines, e.g., by calibrating a performance model based on differences between predicted and actual values, and adjusting one or more operating parameters of turbomachine 100 based on calculated inter-stage conditions yielded from the calibrated performance model. As shown, turbine component 104 can include multiple turbine rotor wheels 122a, 122b, 122c, 122d with corresponding turbine rotor blades 124a, 124b, 124c, 124d. The various turbine rotor wheels 122 and blades 124 can each define corresponding stages of turbine component 104, with "a" designating a first stage and "d" designating a final stage of turbine component 104. Although four stages are illustrated as an example, it is understood that various turbine components 104 may include, e.g., five turbine stages, ten turbine stages, twenty turbine stages, etc. A path for operating fluid through turbine component 104 can include multiple inter-stage positions 152a, 152b, 152c, 152d, 152e generally defined by their location before, between, and/or after other turbine rotor wheels 122 and blades 124. Although inter-stage positions 152a, 152e are respectively shown as being immediately before a first stage or after a last stage, these portions of turbine component 104 may still be identified as inter-stage positions 152.

During operation, operative fluid (e.g., hot gas yielded from combustor 110 (FIG. 1)) can enter an inlet 156 of turbine component 104 from a connecting line 154, with a corresponding set of input conditions. An "input condition," as described herein, generally refers to any single quantifiable property or group of quantifiable properties pertaining to operating fluids within turbomachine 100 (FIG. 1) upon entering turbine component 104, and before the operative fluid has reached components thereof such as turbine rotor wheels 122 and blades 124 for extracting energy from the operative fluid. As examples, input conditions of fluids in inlet 156 can include without limitation, a temperature (expressed, e.g., in degrees Celsius (° C.), a pressure (expressed, e.g., in Pascals (Pa)), a mass flow rate (expressed, e.g., in kilograms (kg) per second (s)), and/or a volumetric flow rate (expressed, e.g., in cubic meters ($m^3$) per second). Other types of input conditions can include, e.g., fluid velocity, kinetic energy, volumetric flux, fluid density, fluid momentum, viscosity, and dimensionless properties derived from one or more other conditions.

Fluids entering turbine component 104 through inlet 156 can then pass through successive turbine stages (defined, e.g., turbine rotor wheels 122, 124) and inter-stage positions 152 before exiting turbine component 104 through outlet 158. The fluid connection through turbine component 104 from inlet 156 to outlet 158 can define a fluid flow path through turbine component 104 traversing each turbine rotor blade and wheel 122, 124 of the various turbine stages and their inter-stage positions 152. Upon reaching outlet 158, the operative fluid may have a corresponding set of output conditions which differ from the input conditions of turbine component 104 due to the conversion of energy the fluid to movement of turbine rotor blades 124 and electrical energy provided by generator 130. An "output condition," as described herein, generally refers to any single quantifiable property or group of quantifiable properties pertaining to operating fluids of turbomachine 100 (FIG. 1) upon exiting turbine component 104, after the operative fluid has reached components thereof such as turbine rotor wheels 122 and blades 124 for extracting energy from the operative fluid. Although the input and output conditions for turbine component 104 will have different amounts, the quantities included in the term "output condition" can encompass the same and similar examples to those provided elsewhere herein for input conditions while pertaining to outlet 164.

To control the operation of turbine component 104 in a machine, embodiments of system 150 can include a controller 160 coupled to various sensors, valves, etc., of turbomachine 100 (FIG. 1) and/or turbine component 104 to determine and control various aspects thereof as discussed herein. Controller 160 can generally include any type of computing device capable of performing operations by way of a processing component (e.g., a microprocessor) and as examples can include a computer, computer processor, electric and/or digital circuit, and/or a similar component used for computing and processing electrical inputs. Example components and operative functions of controller 160 are discussed in detail elsewhere herein.

One or more inlet sensors 162, outlet sensors 164, stage sensors 166, and/or path sensors 168 can be in communication with controller 160 and can be positioned, e.g., within corresponding areas of turbine component 104 where operating fluids can be measured or examined including without limitation: inlet 156, outlet 158, locations proximal to turbine rotor wheels 122 and blades 124, and/or inter-stage positions 152. Each sensor 162, 164, 166, 168 can be configured to determine (e.g., by direct measurement and/or calculation from related variables) various quantities such as the input conditions, output conditions, fluid path conditions (e.g., the temperature, pressure, and/or flow rate of operative fluids within turbine component 104), etc., in turbine component 104 to model and affect the performance of turbine component 104 in a machine.

A variety of sensors can be used in embodiments of the present disclosure. Sensor(s) 162, 164, 166, 168 can be in the form of temperature sensor(s), flow sensor(s), pressure sensor(s), and/or other devices for evaluating the properties of the operative fluid at a particular location. Sensor(s) 162, 164, 166, 168 in the form of a temperature sensor can include thermometers, thermocouples (i.e., voltage devices indicating changes in temperature from changes in voltage), resistive temperature-sensing devices (i.e., devices for evaluating temperature from changes in electrical resistance), infrared sensors, expansion-based sensors (i.e., sensors for deriving changes in temperature from the expansion or contraction of a material such as a metal), and/or state-change sensors. Where one or more sensors 162, 164, 166, 168 include temperature sensors, the temperature of fluid(s) passing through the location of sensor(s) 162, 164, 166, 168 can be measured and/or converted into an electrical signal or input relayed to controller 160. Sensor(s) 162, 164, 166, 168 in the form of pressure sensors can include barometers, manometers, tactile pressure sensors, optical pressure sensors, ionizing pressure sensors, etc. For calculating flow rate and/or other kinetic properties of the operative fluid, sensor(s) 162, 164, 166, 168 can include, e.g., air flow meters, mass flow sensors, anemometers, etc. Sensor(s) 162, 164, 166, 168 may also derive one or more parameters from other measured quantities, e.g., temperature, pressure, flow rate, etc. These measured quantities, in turn, can be measured at multiple positions of turbine component 104 and/or turbomachine 100 and applied to mathematical models of fluid flow through a particular component, e.g., via controller 160. In this case, sensor(s) 162, 164, 166, 168 can include components for measuring variables related to temperature and processing components (e.g., computer software) for prediction and/or calculating values of temperature or other metrics based on the related variables. In general, the term "calculating" in the context of sensor(s) 162, 164, 166, 168 refers to the process of mathematically computing a particular value by direct measurement, predictive modeling, derivation from related quantities, and/or other mathematical techniques for measuring and/or finding a particular quantity. In any event, the conditions measured by each sensor(s) 162, 164, 166, 168 can be indexed, tabulated, etc., according to a corresponding time of measurement. As is discussed elsewhere herein, controller 160 can act as a "pseudo-sensor" for calculating (e.g., by estimation or derivation) one or more operating conditions at positions within turbine component 104 which do not include sensor(s) 162, 164, 166, 168.

In addition to sensor(s) 162, 164, 166, 168 for calculating the properties of operative fluid at various positions of turbine component 104, system 150 can also include an energy sensor 170 for measuring, e.g., an energy output from turbine component 104. Energy sensor 170 can generally be embodied as any currently-known or later-developed instrument for measuring the energy produced by turbine component 104 and/or generator 130 including without limitation, a current sensor, a voltage detector, a magnetometer, a velocity sensors configured to measure a rotation of shaft 106 (including, e.g., optical-based sensors, positional sensors, capacitive sensors, tachometers, etc.), and/or other types of sensors for calculating an amount of energy produced by turbine component 104 and/or generator 130. Energy sensor 170, regardless of the embodiment(s) used, can be communicatively connected (e.g., electrically and/or wirelessly) to controller 160 to calculate an energy output from turbine component 104. In addition, the energy output detected with energy sensor 170 can be tabulated or otherwise indexed by time of measurement, such that the calculated energy output(s) can be cross-referenced in controller 160 to conditions calculated with sensor(s) 162, 164, 166,

168. Controller 160 can calculate energy outputs from turbine component 104 which correspond to the set of input conditions, output conditions, etc., calculated with sensor(s) 162, 164, 166, 168.

Turbine component 104 and system 150 can include one or more control valves 172 positioned, e.g., between connecting line 154 and inlet 156 (i.e., between combustor 110 and turbine component 104) to adjust various aspects of turbomachine 100 (FIG. 1) during operation. Although control valve 172 is shown by example of being positioned proximal to inlet 156, it is also understood that other control valves 172 can be positioned in other portions of turbomachine 100, e.g., to affect the flow rate of fluids entering or leaving compressor component 102 (FIG. 1), combustor(s) 110 (FIG. 1), and/or other portions of turbomachine 100 where operative fluid flows. Regardless of which control valve(s) 172 are manipulated, one or more variables such as the amount, temperature, flow rate, etc., of operative fluids within turbine component 104 can be affected by adjusting the position of control valve(s) 172 as described herein. Control valve(s) 172 can control an amount or fraction of operative fluid entering turbine component 104 from combustor 110, and more specifically can govern the rate at which operative fluids are introduced to turbine component 104 from a preceding component. The operative fluid which does not enter turbine component 104 can be diverted through a bypass line 174, e.g., to other components of turbomachine 100 and/or can be expelled therefrom without entering turbine component 104.

As discussed herein, control valve 172 can be operably coupled to controller 160 such that controller 160 governs the position of control valve 172 during operation of turbomachine 100 (FIG. 1). Controller 160, more specifically, can adjust a position of control valve 172 based on a calibrated performance model of turbomachine 100, which in turn can be calibrated based on inputs and/or signals derived from various quantities detected and/or determined by sensor(s) 162, 164, 166, 168, 170. In an example embodiment, controller 160 can adjust a position of valve 172 based on a calibrated performance model using measured values of the input conditions, output conditions, energy output, etc., yielded from sensor(s) 162, 164, 166, 168, 170. In addition to directly controlling a start up rate of turbomachine 100 and/or a flow rate of fluids entering turbine component 104, control valve 172 can also affect other properties such temperature, pressure, etc., in various portions of turbine component 104, a differential expansion of turbine rotor wheels 122 and blades 124 in turbine component 104 (i.e., an increase in volume or area resulting from thermal expansion), thermal stress of internal components in turbine component 104, etc. In addition, these characteristics and/or other characteristics of turbine component 104 can be adjusted, e.g., by controlling the amount of combustion in combustor 110 through a mechanical and/or electrical coupling between combustor 110 and controller 160. To this end, controller 160 can include program code installed by a user which includes a performance model for relating one or more properties (e.g., input conditions, output conditions, inter-stage conditions, etc.) to other characteristics of turbine component 104 in order to actively model and control the performance of turbine component 104 during its operation as described herein.

Figure 3:
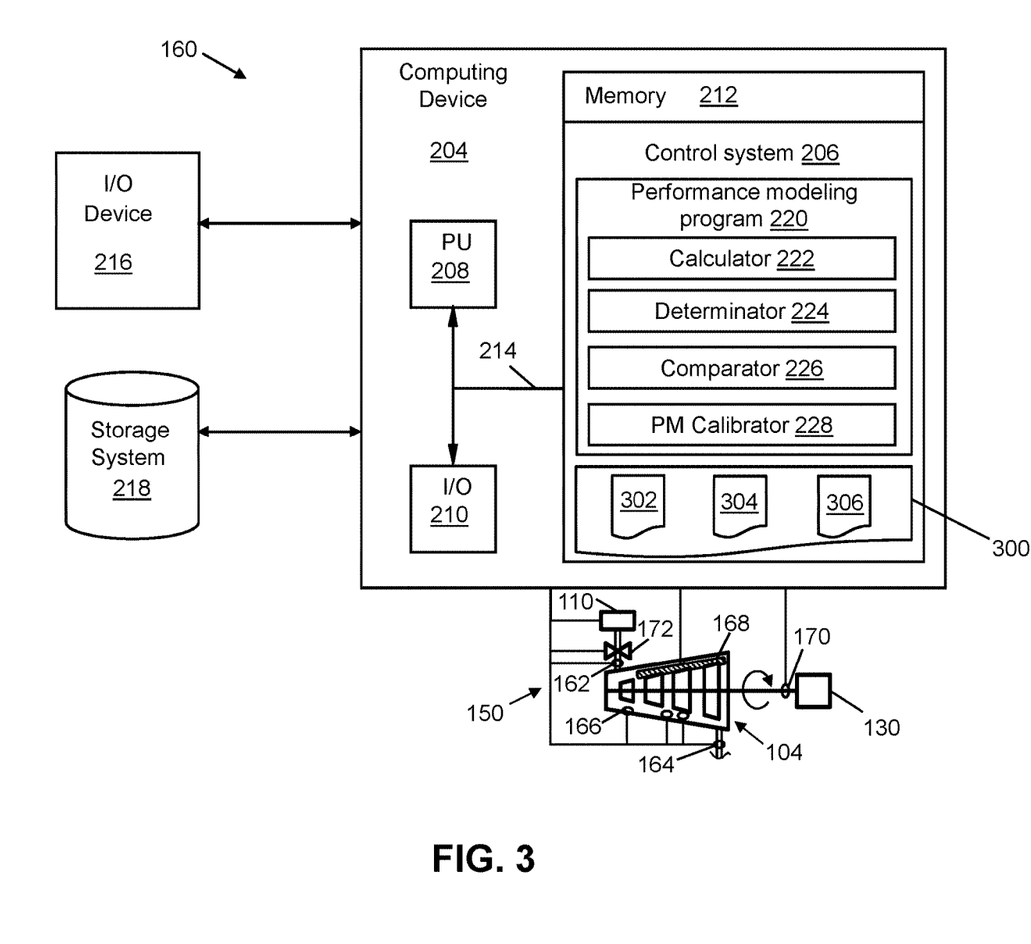
FIG. 3 shows an example computer environment operable to control a machine according to embodiments of the present disclosure.

Referring to FIGS. 2 and 3 together, an example embodiment of controller 160 and sub-components thereof is illustrated with a simplified depiction of system 150. In particular, controller 160 can include a computing device 204, which in turn can include a control system 206. The components shown in FIG. 3 are one embodiment of a system for controlling a machine. As discussed herein, computing device 204 can provide a performance model which relates operating conditions and/or other characteristics of turbine component 104 in turbomachine 100 (FIG. 1) with each other. Furthermore, embodiments of the present disclosure can calibrate a pre-configured performance model of turbomachine 100 during its operation based on, e.g., measurements obtained with sensor(s) 162, 164, 166, 168, 170. Embodiments of the present disclosure may be configured or operated in part by a technician, computing device 204, and/or a combination of a technician and computing device 204. It is understood that some of the various components shown in FIG. 3 can be implemented independently, combined, and/or stored in memory for one or more separate computing devices that are included in computing device 204. Further, it is understood that some of the components and/or functionality may not be implemented, or additional schemas and/or functionality may be included as part of control system 206.

Computing device 204 can include a processor unit (PU) 208, an input/output (I/O) interface 210, a memory 212, and a bus 214. Further, computing device 204 is shown in communication with an external I/O device 216 and a storage system 218. Control system 206 can execute a performance modeling program 220, which in turn can include various software components configured to perform different actions, including a calculator 222, a determinator 224, a comparator 226, a performance model calibrating module ("PM Calibrator") 228. The various modules of control system 206 can use algorithm-based calculations, look up tables, and similar tools stored in memory 212 for processing, analyzing, and operating on data to perform their respective functions. In general, PU 208 can execute computer program code to run software, such as control system 206, which can be stored in memory 212 and/or storage system 214. While executing computer program code, PU 208 can read and/or write data to or from memory 212, storage system 218, and/or I/O interface 210. Bus 214 can provide a communications link between each of the components in computing device 204. I/O device 216 can comprise any device that enables a user to interact with computing device 204 or any device that enables computing device 204 to communicate with the equipment described herein and/or other computing devices. I/O device 216 (including but not limited to keyboards, displays, pointing devices, etc.) can be coupled to controller 160 either directly or through intervening I/O controllers (not shown).

Memory 212 can also include various forms of data 300 pertaining to one or more machines and/or components thereof, turbomachine 100 (FIG. 1) and/or turbine component(s) 104. As discussed elsewhere herein, controller 160 can adjust control valve 172, combustor 110, and/or other operating parameters of a machine based on a pre-configured performance model of turbomachine 100 and/or a calibrated performance model yielded from PM calibrator 228. To calibrate performance models of a machine, performance modeling program 220 of control system 206 can store and interact with data 300 in processes of the present disclosure. For example, input conditions field 302 can include one or more sets of input conditions of turbine component 104 at corresponding times. More specifically, each entry of input conditions field 302 can include a single group of input conditions measured (e.g., with sensor(s) 162, 164, 166, 168, 170) during the operation of turbine component 104 at a particular point in time, such as temperatures, pressures, flow rates, etc., of operative fluid at inlet 156.

Data 300 can also include an output conditions field 304 which includes one or more sets of output conditions measured (e.g., with sensor(s) 162, 164, 166, 168, 170) during the operation of turbine component 104 at various times. For example, output conditions field 304 can include temperatures, pressures, flow rates, etc., of operative fluid in outlet 158, which may correspond to a given point in time. Other detected operating conditions of turbomachine 100 can be stored elsewhere within data 300 using other fields and/or groups of fields. A pre-configured performance model can be stored in a performance model field 306 which can include one or more systems of equations for mathematically relating the various operational conditions of turbine component 104 with each other. The performance model(s) stored in performance model field 306 can include pre-configured performance models of turbomachine 100 and/or other turbomachines, and/or can include calibrated performance models yielded from the various process steps described herein. It is thereby understood that data 300 can include several measured and/or calculated variables which can be applied to performance model(s) stored in performance model field 306 to model the performance of a machine which includes turbine component 104.

PM calibrator 228 can calibrate pre-configured performance models stored in performance model field 306 using measured and/or calculated operating conditions of a machine, which may be stored, e.g., within input conditions field 302, output conditions field 304, and/or as other forms of data 300 as described elsewhere herein. PM calibrator 228, more specifically, can modify the modeled relationship between variables in a pre-configured performance model based on data 300 and/or predetermined information regarding turbine component 104 and other components of turbomachine 100 (FIG. 1) (e.g., a combustion temperature in combustion 110, a specification size of turbine rotor wheels 122 and blades 124, a material composition of each element in turbine component 104, etc.). Control system 206 can thereby adjust the performance of turbomachine 100 in real-time based on the collected data 300 and/or calibrated performance model(s) yielded from PM calibrator 228, e.g., by adjusting the position of control valve 172 and/or other components of turbomachine 100 to affect its operation. Controller 160 can adjust control valve 172 and/or other components using control inputs in the form of, e.g., digital commands, instructions, etc., which can be converted into mechanical adjustments of control valve 172 and/or other components. Adjusting control valve 172 can directly change a flow rate of operative fluid entering inlet 156 from combustor 110, and such changes in flow rate can indirectly affect other operating parameters of turbomachine 100 modeled using a pre-configured and/or calibrated performance model. As examples, the flow rate of operative fluid within inlet 156 can affect the temperature (i.e., a temperature in Celsius degrees (° C.) of operative fluids within turbine component 104, the differential expansion of one or more turbine rotor wheels 122 and/or blades 124 (i.e., an amount of material expansion caused by operation at elevated temperatures and measured, e.g., in centimeters (cm)), an amount of thermal stress exerted against components of turbine component 104 by operative fluids in a fluid path (i.e., an amount of force per area imparted against rotor wheels 122 and/or blades 124, measured in Newtons (N) per square meter (m$^2$), etc. The flow rate of operative fluids entering turbine component 104 can also affect, e.g., a start-up rate of turbine component 104, a concentration of emissions from combustor 110, a rotational speed of shaft 106, a clearance between turbine rotor blades and a sidewall of turbine component 104, etc.

Computing device 204 can comprise any general purpose computing article of manufacture for executing computer program code installed by a user (e.g., a personal computer, server, handheld device, etc.). However, it is understood that computing device 204 is only representative of various possible equivalent computing devices and/or technicians that may perform the various process steps of the disclosure. In addition, computing device 204 can be part of a larger system architecture of controller 160, operable to control various aspects and elements of a machine.

To this extent, in other embodiments, computing device 204 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 204 may include a program product stored on a computer readable storage device, which can be operative to automatically control machines (e.g., through turbine component 104) when executed.

Figure 4:
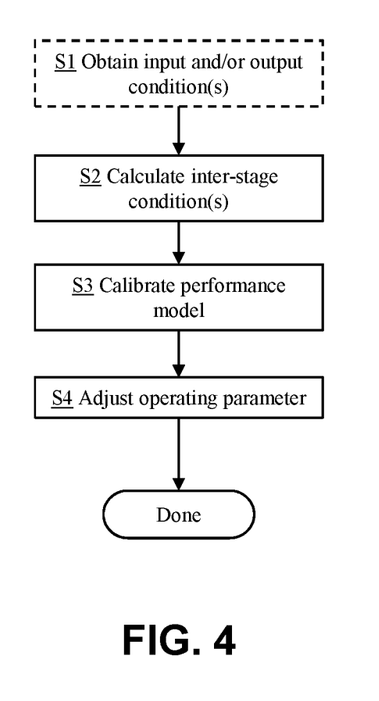
FIG. 4 provides an illustrative flow diagram of a method for controlling a machine according to embodiments of the present disclosure.

Referring to FIGS. 2-4 together, steps for controlling a machine in embodiments of the present disclosure are shown. The steps shown in FIG. 4 and described herein provide a general process overview for implementing embodiments of the present disclosure, and are discussed by reference to a group of illustrative examples. In addition, the process flow illustrated in FIG. 4 can be implemented, e.g., by way of system(s) 150 including controller(s) 160 therein. During the operation of a machine such as turbomachine 100 (FIG. 1), performance modeling program 220 of controller 160 can measure, calculate, or otherwise obtain a set of input conditions and a set of output conditions pertaining to turbine component 104 at step S1. The obtaining of input and/or output conditions in step S1 can be performed using sensor(s) 162, 164, 166, 168, 170, and/or at least partially with controller 160. Step S1 thereby can be embodied as a separate or preliminary step, and is shown in phantom in FIG. 4 for this reason. In an embodiment, these and other input conditions for turbine component 104 can be transmitted to controller 160, e.g., through sensor(s) 162, 164, 166, 168, 170 and/or other instruments configured to measure, derive, etc., one or more properties of operative fluids in inlet 156 to turbine component 104. As discussed herein, the input and/or conditions calculated in step S1 can include, e.g., a temperature, pressure, and/or flow rate of the operative fluid and can be stored as data 300 in input conditions field 302 or output conditions field 304. In any event, the input and output conditions calculated for turbine component 104 in step S1 can be indexed and/or cross-referenced relative to various operating times, such that each of the input and/or output conditions can be plotted relative to the time of operation.

After calculating input and output conditions in step S1, the flow can proceed to step S2 of calculating one or more inter-stage conditions of turbine component 104 during operation of the machine. More specifically, calculator 222 of performance modeling program 220 calculate a temperature, pressure, flow rate, etc., within at least one inter-stage position 152a, 152b, 152c, 152d of turbine component 104 during operation using a pre-configured performance model and related quantities (e.g., input and output conditions calculated in step S1). For example, an inlet temperature of approximately 1200° C., outlet temperature of approximately 1000° C., and inlet flow rate of approximately 0.5 kg per second may correspond to a temperature of approximately 1100° C. at inter-stage position 152*d*. The calculated inter-stage condition(s) can be indexed and/or cross referenced to various times. As a result, the inter-stage condition(s) calculated in step S2 using a performance model can correspond to input and/or output conditions for turbomachine 100 calculated in step S1 at particular instances of time.

In addition to calculating inter-stage conditions of turbomachine 100 in real-time during operation, embodiments of the present disclosure also provide machine learning processes to continuously calibrate a pre-configured performance model using real-time data of turbomachine 100. At step S3, PM calibrator 228 can calibrate the pre-configured performance model for the machine which was used in step S2 to calculate one or more inter-stage conditions. As discussed herein, a pre-configured performance model (stored, e.g., in performance model field 306) can mathematically estimate various properties in respective stages of turbine component 104 based on a group of input variables (e.g., input temperature, output flow rate, joules produced) and predefined values (e.g., ignition temperature in combustor 110, chemical properties of reactants in combustor 110, chemical properties of operating fluids in turbine component 104), etc. PM calibrator 228 of performance modeling program 220 can adjust a pre-configured performance model based on a difference between the condition(s) and output(s) obtained in step S1 and any calculated values of the same conditions yielded in step S2. PM calibrator 228 thereby can modify a previously generated performance model (based on, e.g., past operation of turbomachine 100, the operation of other machines, test data related to prototypes, manufacturing tests, etc.) in step S3 to provide an updated set of data for controlling the operation of a machine.

After calibrating the performance model in step S3, the flow can proceed to step S4 of adjusting one or more operating parameters of the machine based on the various attributes of turbine component 104 calculated with the performance model. Controller 160 can automatically adjust a position of control valve 172, a firing temperature and/or rate of combustor 110, and/or other aspects of a machine to further control the operation of turbine component 104. The action(s) implemented by controller 160 in step S4 can vary based on the operation of turbine component 104. For example, to reduce an amount of thermal stress imparted against turbine rotor wheels 122 and blades 124, controller 160 can adjust the position of control valve 172 to increase or limit the flow rate of hot combusted gas passing through turbine component 104. Some example implementations, sub-steps, etc., of step S4 are shown in FIG. 5 and discussed in detail elsewhere herein.

Figure 5:
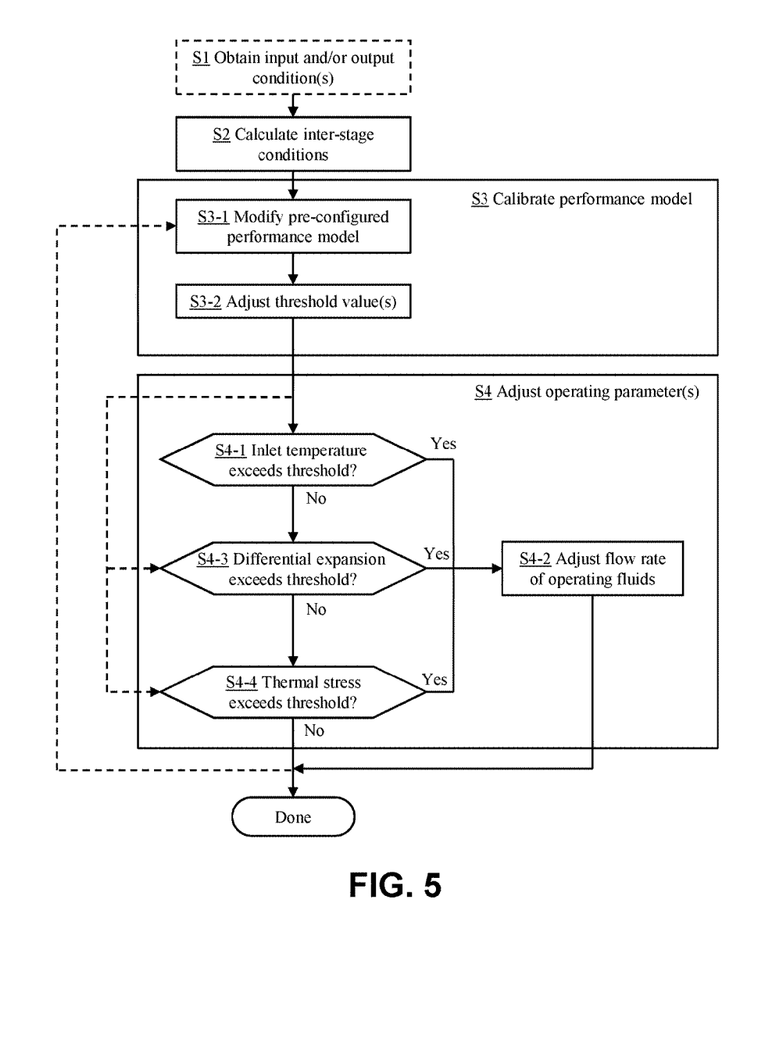
FIG. 5 provides an illustrative flow diagram of an alternative method for controlling a machine according to embodiments of the present disclosure.

Referring to FIGS. 2, 3, and 5 together, processes and sub-processes for controlling the operation of a machine are discussed. Steps S1 and S2 can be implemented in controller 160 substantially in accordance with the overview process flow in FIG. 4 and/or the example embodiments discussed elsewhere herein. Although FIG. 5 includes several sub-processes for steps S3 and S4, it is understood that alternative embodiments may include executing steps S3 and/or S4 in the simplified form illustrated in FIG. 4, and/or omitting and/or rearranging the various optional sub-processes for steps S3 and S4 shown in FIG. 5 and described herein.

After calculating the energy output from turbine component in step S2, controller 160 can include modifying a pre-configured model for turbomachine 100 (FIG. 1) and/or another machine from a group of possible performance models in step S3-1. The pre-configured performance model may have been manually constructed by a user, generated automatically by an embodiment of controller 160 for the same machine or for a different machine, and/or may have been generated via a combination of techniques. Modifying the pre-configured performance model can include, e.g., adjusting one or more mathematical relationships between variables and/or constants included with the performance model to update the mathematical relationship between various operating conditions of turbomachine 100. The processes applied in step S3-1 can include the same adjustments described elsewhere herein with respect to the general process description of step S3, i.e., adjusting a preconfigured performance model within performance model field 306 using PM calibrator 228.

In an example embodiment, the pre-configured performance model may estimate a temperature of e.g., approximately 1150 degrees Celsius (° C.) at a second turbine stage based on an inlet temperature of 1200° C., an outlet temperature of 1070° C., and an energy output of 50 megawatts (MW) e.g., by application of predetermined correlations, material properties of turbomachine 100, etc. However, one or more sensors 166 may detect an actual temperature of approximately 1180° C. at the second stage of turbine component 104. Where the pre-configured performance model differs from the true operation of turbomachine 100, PM calibrator 228 of control system 206 can adjust the pre-configured performance model at step S3-1. PM calibrator 228 can adjust the pre-configured performance model at step S3-1, e.g., by increasing or decreasing one or more predetermined correlations between inputs (e.g., the calculated variables in steps S1 and S2) and one or more outputs. Thus, the process of calibrating a performance model in step S3 can include selecting and adjusting one or more variables within a performance models in steps S3-1.

The process can then proceed to step S3-2 of adjusting one or more threshold values stored within the performance model, e.g., maximum inlet temperatures, differential expansion levels, and/or thermal stress which may indicate safety thresholds, efficiency thresholds, etc., for a particular turbomachine 100. These values may be stored in respective fields of data 300, and processes for comparing operational conditions of turbomachine 100 with one or more thresholds are discussed in detail herein with respect to sub-processes of step S4.

Adjusting an operating parameter of the machine in step S4 can include providing one or more detailed adjustments based on whether one or more properties of turbomachine 100 exceeds a threshold value. Generally, embodiments of the present disclosure can include comparing one or more properties of turbine component 104 during operation with predetermined values or thresholds (stored, e.g., in memory 212 of controller 160) to further adjust various operating parameters of a machine. For example, the inlet temperature can be obtained directly or indirectly from sensor(s) 162, 164, 166, 168 e.g., using the generated performance model of step S3. In the case of differential expansion in turbine component 104, (i.e., an amount of surface are or volumetric growth of turbine rotor wheels 122 (FIG. 1) or blades 124 (FIG. 1) at one or more stages) calculator 222 can calculate one or more values of differential expansion, e.g., in centimeters, cubic centimeters, etc., using data 300 from fields 302, 304, 306 in conjunction with the calibrated performance model.

Where the operating parameters include a thermal stress, performance modeling program 220 can implement different calculations. Stress generally refers to an amount of internal mechanical force exerted against the surface area of a material, and can be measured, e.g., in Newtons per square meter ($m^2$). Thermal stress, more specifically, can be stress imparted from operative fluids in turbine component 104 against moving components thereof (e.g., turbine rotor wheels 122 (FIGS. 1-2) and blades 124 (FIGS. 1-2), and thus can be directly proportional to an environmental temperature. Calculator 222 of performance modeling program 220 can calculate an amount of thermal stress imparted by operative fluids against turbine rotor wheels 122 and blades 124 of turbomachine 100 (FIG. 1). More specifically, the amount of thermal stress can be calculated by applying data 300 stored in fields 302, 304, 306 to a performance model, e.g., calibrated by PM calibrator 228 in step S3.

In one embodiment, comparator 226 of performance modeling program 220 can compare an inlet temperature of turbine component 104 with one or more predetermined thresholds in step S4-1. The predetermined threshold may correspond to, e.g., a maximum temperature to avoid negative mechanical effects (e.g., additional wear of components in some cases). Based on this comparison, determinator 224 of control system 206 may indicate that the inlet temperature to turbine component 104 exceeds a particular threshold (i.e., "Yes" at step S4-2). In this case, the process can proceed to step S4-2, in which determinator 224 of control system 206 determines and adjusts the flow rate of operative fluids to turbine component 104 to affect the temperature of operative fluids within turbomachine 100. In an example embodiment, adjusting the flow rate of operative fluids within turbine component 104 can include adjusting the position of control valve 172, changing the fuel intake and/or firing rate of combustor 110, and/or sending control signals to modify the operation other components coupled to or affecting turbine component 104. After adjusting the inlet temperature to turbomachine 100 in step S4-2, the flow can conclude ("Done"), or can proceed to step S3 where PM calibrator 228 of performance modeling program 220 adjusts a performance model of turbomachine 100 in step S3-1 and further adjusts the inlet temperature threshold in step S3-2 based on the new operating conditions of turbomachine 100.

Where the inlet temperature to turbine component 104 does not exceed the threshold (i.e., "No" at step S4-1), comparator 226 of performance modeling program 220 at step S4-3 can compare a modeled amount of differential expansion to one or more predetermined thresholds. Where the differential expansion in turbine component 104 exceeds the threshold (i.e., "No" at step S4-3), the flow can proceed to step S4-2 where determinator 224 adjusts the flow rate of operating fluids within turbine component 104, e.g., to reduce the amount of differential expansion for compliance with requirements and/or preferences. Embodiments of the present disclosure can also include controlling the operation of a machine based on thermal stresses experienced by components thereof. In an example embodiment, performance modeling program 220 can proceed to step S4-4 in the event that amounts of differential expansion in turbine component 104 do not exceed a predetermined threshold (i.e., "Yes" at step S4-3). At step S4-4, comparator 226 of performance modeling program 220 can compare an amount of thermal stress calculated in step S4-1 to one or more predetermined thresholds. Where the thermal in turbine component 104 exceeds the threshold (i.e., "Yes" at step S4-4), the flow can proceed to step S4-2 where determinator 224 of performance modeling program 220 adjusts the flow rate of operating fluids within turbine component 104, e.g., to reduce the amount of differential expansion to comply with requirements and/or user preferences. Where the thermal stress does not exceed the threshold (i.e., "No" at step S4-4), the flow can conclude ("Done"). It is also understood that one or more of the comparisons in steps S4-1, S4-3, and step S4-4 can be omitted or arranged in a different order, such that a performance modeling program 220 can adjust operating parameters based on selected quantities and/or in a particular order of preference.

Technical effects of the systems and methods disclosed herein include controlling a machine, such as a turbomachine, by calibrating a performance model in real time to provide a more accurate relationship between input conditions, output conditions, and inter-stage conditions. The embodiments discussed herein can allow hardware, software, and/or combinations thereof to automatically control a machine without intervention from a human user. In addition, the embodiments discussed herein can reduce the occurrence of system failures or unstable system operation, or eliminate these events altogether.

The various embodiments discussed herein can offer several technical and commercial advantages, some of which are discussed herein by way of example. Embodiments of the present disclosure can reduce or eliminate human error in controlling a machine subject to varying operational events. Specifically, embodiments of the present disclosure can avoid control inputs which would result in unstable operation or a system failure. Furthermore, embodiments of the method discussed herein can reduce the time needed to determine the relationship between particular inputs and the operating parameters of one machine as it operates. Control systems and methods according to the embodiments described herein can also ensure that a broader range of conditions, including real-time input conditions, output conditions, and/or energy outputs can be used to control the operation of a machine. These advantages can lead to reduced testing times, as well as lower fuel and personnel costs for installation and servicing of a machine. In addition, embodiments of the present disclosure can allow a manufacturer or servicer to apply data obtained from the operation of other machines and/or previous operation of a machine to be applied to other machines and/or new machines at the time of manufacture and installation. More generally, machines being controlled pursuant to embodiments of the present disclosure can yield flexible energy outputs and power generation rates to meet fluctuating consumer demands.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a machine, the method comprising:
    calculating, using a performance model of the machine, a set of inter-stage conditions of the machine corresponding to one of a set of input conditions and a set of output conditions during an operation of the machine, wherein the machine includes a turbine component having a fluid path therein traversing a plurality of turbine stages and a plurality of inter-stage positions, and wherein each of the set of input conditions, the set of output conditions, and the set of inter-stage conditions includes one of a temperature, a pressure, and a flow rate;
    calibrating the performance model of the machine based on a difference between a predicted value in the performance model of the machine and one of the set of input conditions and the set of output conditions; and
    adjusting an operating parameter of the machine based on the calibrated performance model and the calculated set of inter-stage conditions of the machine.

2. The method of claim 1, wherein the performance model of the machine includes a threshold value of thermal stress and thermal expansion within the turbine component of the machine.

3. The method of claim 2, wherein the calibrating of the performance model includes adjusting the threshold value of thermal stress and thermal expansion.

4. The method of claim 3, wherein the adjusting of the operating parameter of the machine includes reducing the flow rate within the inlet in response to the thermal stress and thermal expansion exceeding the threshold value.

5. The method of claim 1, wherein the performance model of the fluid path includes a start-up rate for each of the plurality of turbine stages in the turbine component of the machine.

6. The method of claim 1, wherein the adjusting of the operating parameter includes adjusting the position of a control valve of the turbine component.

7. The method of claim 1, further comprising repeating the calculating, calibrating, and adjusting with the calibrated performance model.

8. The method of claim 1, wherein performance model corresponds to a different machine from the machine being controlled.

9. A system for controlling a machine, the system comprising:
    a system controller in communication with a monitoring system of the machine, the system controller being operable to:
        calculate, using a performance model of the machine, a set of inter-stage conditions of the machine corresponding to a set of input conditions and a set of output conditions during an operation of the machine, wherein the machine includes a turbine component having a fluid path therein traversing a plurality of turbine stages and a plurality of inter-stage positions, wherein each of the set of input conditions, the set of output conditions, and the set of inter-stage conditions includes one of a temperature, a pressure, and a flow rate, and
        calibrate the performance model of the machine based on a difference between a predicted value in the performance model of the machine and one of the set of input conditions and the set of output conditions; and
    a control valve operably coupled to the system controller and an inlet of the turbine component, the control valve being operable to adjust an operating parameter of the machine based on the calibrated performance model and the calculated set of inter-stage conditions of the machine.

10. The system of claim 9, wherein the performance model of the machine includes a threshold value of thermal stress and thermal expansion within the turbine component of the machine.

11. The system of claim 10, wherein the system controller is further operable to adjust the threshold value of thermal stress and thermal expansion based on the difference between the predicted value in the performance model of the machine and one of the set of input conditions and the set of output conditions.

12. The system of claim 9, wherein the system adjusts the control valve to modify the flow rate in the inlet of the turbine component in response to an internal condition of the selected one of the plurality of inter-stage positions exceeding a threshold value.

13. The system of claim 9, wherein the performance model of the fluid path includes a start-up rate for each of the plurality of turbine stages in the turbine component of the machine.

14. The system of claim 9, wherein the system controller is further configured to the calculating, calibrating, and adjusting with the calibrated performance model in response to an adjustment of the control valve.

15. The system of claim 14, wherein the system controller is in communication with a controller of a different machine, and wherein the performance model is pre-configured based using an operation of the different machine.

16. A program product stored on a non-transitory computer readable storage medium for controlling a machine, the non-transitory computer readable storage medium comprising program code for causing a computer system to:

calculate, using a performance model of the machine, a set of inter-stage conditions of the machine corresponding to a set of input conditions and a set of output conditions during an operation of the machine, wherein the machine includes a turbine component having a fluid path therein traversing a plurality of turbine stages and a plurality of inter-stage positions, wherein each of the set of input conditions, the set of output conditions, and the set of inter-stage conditions includes one of a temperature, a pressure, and a flow rate;

calibrate the performance model of the machine based on a difference between a predicted value in the performance model of the machine and one of the set of input conditions and the set of output conditions; and adjust an operating parameter of the machine based on the calibrated performance model and the calculated set of inter-stage conditions of the machine.

17. The program product of claim 16, the operating parameter of the machine includes the flow rate within the inlet.

18. The program product of claim 16, further comprising program code for causing the computer system to repeat the calculating, calibrating, and adjusting with the calibrated performance model.

19. The program product of claim 16, wherein the performance model of the machine includes a threshold value of thermal stress and thermal expansion within the turbine component of the machine.

20. The program product of claim 16, further comprising program code for causing the computer system to adjust adjusting the threshold value of thermal stress and thermal expansion based on the calibrated performance model.

* * * * *